United States Patent
Hara

(10) Patent No.: US 11,373,283 B2
(45) Date of Patent: Jun. 28, 2022

(54) OBJECT MONITORING DEVICE

(71) Applicant: TOYOTA JIDOSHA KABUSHIKI KAISHA, Toyota (JP)

(72) Inventor: Kenichiroh Hara, Yokohama (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 475 days.

(21) Appl. No.: 16/418,416

(22) Filed: May 21, 2019

(65) Prior Publication Data
US 2019/0370952 A1     Dec. 5, 2019

(30) Foreign Application Priority Data

May 31, 2018   (JP) ............................... JP2018-105072

(51) Int. Cl.
*G06T 7/00*   (2017.01)
*G06V 20/59*   (2022.01)

(52) U.S. Cl.
CPC .......... *G06T 7/0002* (2013.01); *G06V 20/597* (2022.01); *G06T 2207/30168* (2013.01); *G06T 2207/30268* (2013.01)

(58) Field of Classification Search
CPC ....... G06T 7/0002; G06T 7/97; G06T 7/0004; G06T 2207/30168; G06T 2207/30268; G06T 5/003; G06V 20/597; G06V 10/993; G06V 10/40; G06V 10/443; G06V 10/751; G06V 10/22; G06V 40/166; G06V 20/52; H04N 5/2171; H04N 5/2354; H04N 5/23219; H04N 5/23254; H04N 5/232945; H04N 17/002; H04N 7/18; H04N 7/183

See application file for complete search history.

(56) References Cited

U.S. PATENT DOCUMENTS

| | | | | |
|---|---|---|---|---|
| 9,467,687 | B2 * | 10/2016 | Takemura | ............... G06V 10/96 |
| 10,842,430 | B1 * | 11/2020 | Novelli | ................... G06F 3/013 |
| 10,853,622 | B2 * | 12/2020 | Hara | ..................... G06V 40/171 |
| 10,970,572 | B2 * | 4/2021 | Matsumura | .......... G06V 40/172 |

(Continued)

FOREIGN PATENT DOCUMENTS

| JP | 2003-259358 A | 9/2003 |
|---|---|---|
| JP | 2017-143526 A | 8/2017 |

OTHER PUBLICATIONS

"Real-time image-based driver fatigue detection and monitoring system for monitoring driver vigilance"; Xinxing Tang, 2016 35th Chinese Control Conference (CCC) (pp. 4188-4193) (Year: 2016).*

*Primary Examiner* — Michael S Osinski
(74) *Attorney, Agent, or Firm* — Sughrue Mion, PLLC

(57) ABSTRACT

An object monitoring device 1 comprises an imaging device 2 capturing an image of a range in which a predetermined object should be present and generating an image, an object recognizing part 34 recognizing the object based on the image, a detecting part 35 detecting that the image is unclear, a storage part 31 storing detection information showing that it has been detected that the image is unclear, and a judging part 36 judging a cause for the object not being recognized when the object is not recognized based on the image. When a state occurs where the object is not recognized based on the image and it is not detected that the image is unclear, the judging part judges whether the cause is in the imaging device based on the detection information in a predetermined time period until the state occurs.

16 Claims, 5 Drawing Sheets

(56) References Cited

U.S. PATENT DOCUMENTS

| | | | |
|---|---|---|---|
| 2006/0165265 A1* | 7/2006 | Fujimatsu | G06V 40/19 382/117 |
| 2007/0253603 A1* | 11/2007 | Kimura | G06V 40/166 382/115 |
| 2013/0301882 A1* | 11/2013 | Kawaguchi | G06V 40/20 382/103 |
| 2014/0267836 A1* | 9/2014 | Nishizaka | H04N 5/232945 348/241 |
| 2016/0007018 A1* | 1/2016 | Ooi | H04N 17/002 348/187 |
| 2016/0165101 A1* | 6/2016 | Akiyama | G06T 7/42 348/187 |
| 2018/0189970 A1* | 7/2018 | Balasu | H04N 7/185 |
| 2018/0201274 A1* | 7/2018 | Matsumura | B60W 40/09 |
| 2019/0107842 A1* | 4/2019 | Miura | G05D 1/0246 |
| 2019/0124264 A1* | 4/2019 | Kogure | G06T 1/0007 |
| 2019/0135294 A1* | 5/2019 | Sato | G06V 40/172 |
| 2019/0135295 A1* | 5/2019 | Sato | G06F 3/013 |
| 2019/0138790 A1* | 5/2019 | Matsumura | G06V 20/597 |
| 2019/0163997 A1* | 5/2019 | Matsumura | G06V 20/597 |
| 2019/0174029 A1* | 6/2019 | Mandai | G06T 7/00 |
| 2019/0213479 A1* | 7/2019 | Takigawa | G06N 5/00 |
| 2019/0377933 A1* | 12/2019 | Hara | G06V 40/171 |
| 2020/0026938 A1* | 1/2020 | Nishimura | G06V 40/193 |
| 2020/0210731 A1* | 7/2020 | Yamanaka | G08G 1/146 |
| 2020/0346690 A1* | 11/2020 | Maruoka | B62D 15/0275 |
| 2021/0039713 A1* | 2/2021 | Hara | G05D 1/0088 |
| 2021/0211740 A1* | 7/2021 | Wang | B60R 1/00 |
| 2021/0218589 A1* | 7/2021 | Shimizu | H04N 5/23219 |
| 2021/0390322 A1* | 12/2021 | Hara | G06V 40/165 |
| 2022/0004789 A1* | 1/2022 | Hara | G06V 20/597 |
| 2022/0004790 A1* | 1/2022 | Tomosue | G06V 20/597 |

* cited by examiner

OBJECT MONITORING DEVICE

FIELD

The present invention relates to an object monitoring device.

BACKGROUND

In the past, it has been known to use an imaging device to capture an image of an object (human being, animal, workpiece, etc.) to detect the object. The lens of the imaging device is exposed to the outside so as to capture the image of the object. For this reason, the lens sometimes becomes dirty, clouded, or otherwise abnormal. If the lens becomes abnormal, the image generated by the imaging device becomes unclear and the precision of detection of the object falls.

For this reason, it is desirable to detect any abnormality of the lens of the imaging device. In the information processing device described in PTL 1, abnormality of the imaging device is judged by comparing a first image generated by capturing the image of an object and a second image generated by capturing an image of an object in a posture different from the first image.

CITATION LIST

Patent Literature

[PTL 1] Japanese Unexamined Patent Publication No. 2017-143526
[PTL 2] Japanese Unexamined Patent Publication No. 2003-259358

SUMMARY

Technical Problem

In this regard, sometimes an imaging device is used as an object monitoring device monitoring an object and always captures an image of a predetermined range. In this case, the imaging device is fixed in place and movement of the object cannot be predicted, so it is not possible to intentionally generate two images of the object in different states. For this reason, it is not possible to use the technique described in PTL 1 to detect an abnormality in the imaging device.

Further, in an object monitoring device, if an object cannot be recognized based on an image generated by the imaging device, the cause may be an abnormality of the imaging device or an abnormality of the object. An abnormality of an object means the object is not in a normal state. An abnormality of an object obstructs recognition of the object. To precisely detect an abnormality of an object, it is necessary to identify the cause of the object not being recognized.

In consideration of the above problem, an object of the present invention is to precisely identify the cause of an object not being recognized in an object monitoring device monitoring an object.

Solution to Problem

The summary of the present disclosure is as follows.

(1) An object monitoring device comprising an imaging device capturing an image of a range in which a predetermined object should be present and generating an image, an object recognizing part recognizing the object based on the image, a detecting part detecting that the image is unclear, a storage part storing detection information showing that it has been detected that the image is unclear, and a judging part judging based on the image the cause for the object not being recognized when the object is not recognized, when the state occurs where the object is not recognized based on the image and it is not detected that the image is unclear, the judging part judging if the cause is in the imaging device based on the detection information in a predetermined time period until the state occurs.

(2) The object monitoring device described in above (1), wherein when the state occurs, the judging part judges that the cause is in the imaging device if the number of times or frequency of it being detected that the image is unclear in the predetermined time period is a predetermined value or more.

(3) The object monitoring device described in above (1), wherein when the state occurs, the judging part judges that the cause is in the imaging device if the frequency of it being detected that the image is unclear increases along with time in the predetermined time period.

(4) The object monitoring device described in above (1), wherein the judging part judges that the cause is in the imaging device when the object is not recognized based on the image and it is detected that the image is unclear, and when the state occurs, the judging part judges that the cause is in the imaging device if the number of times or frequency of it being judged that the cause is in the imaging device when the state has not occurred in the predetermined time period is a predetermined value or more.

(5) The object monitoring device described in above (1), wherein the judging part judges that the cause is in the imaging device when the object is not recognized based on the image and it is detected that the image is unclear, and when the state occurs, the judging part judges that the cause is in the imaging device if the frequency of it being judged that the cause is in the imaging device when the state has not occurred increases along with time in the predetermined time period.

(6) The object monitoring device described in any one of above (1) to (5), wherein the object is a driver of a vehicle.

(7) The object monitoring device described in above (6), wherein the judging part prompts the driver to clean the imaging device when the state has occurred and it is judged that the cause is in the imaging device.

Advantageous Effects of Invention

According to the present invention, it is possible to precisely identify the cause of an object not being recognized in an object monitoring device monitoring an object.

DESCRIPTION OF EMBODIMENTS

Figure 1:
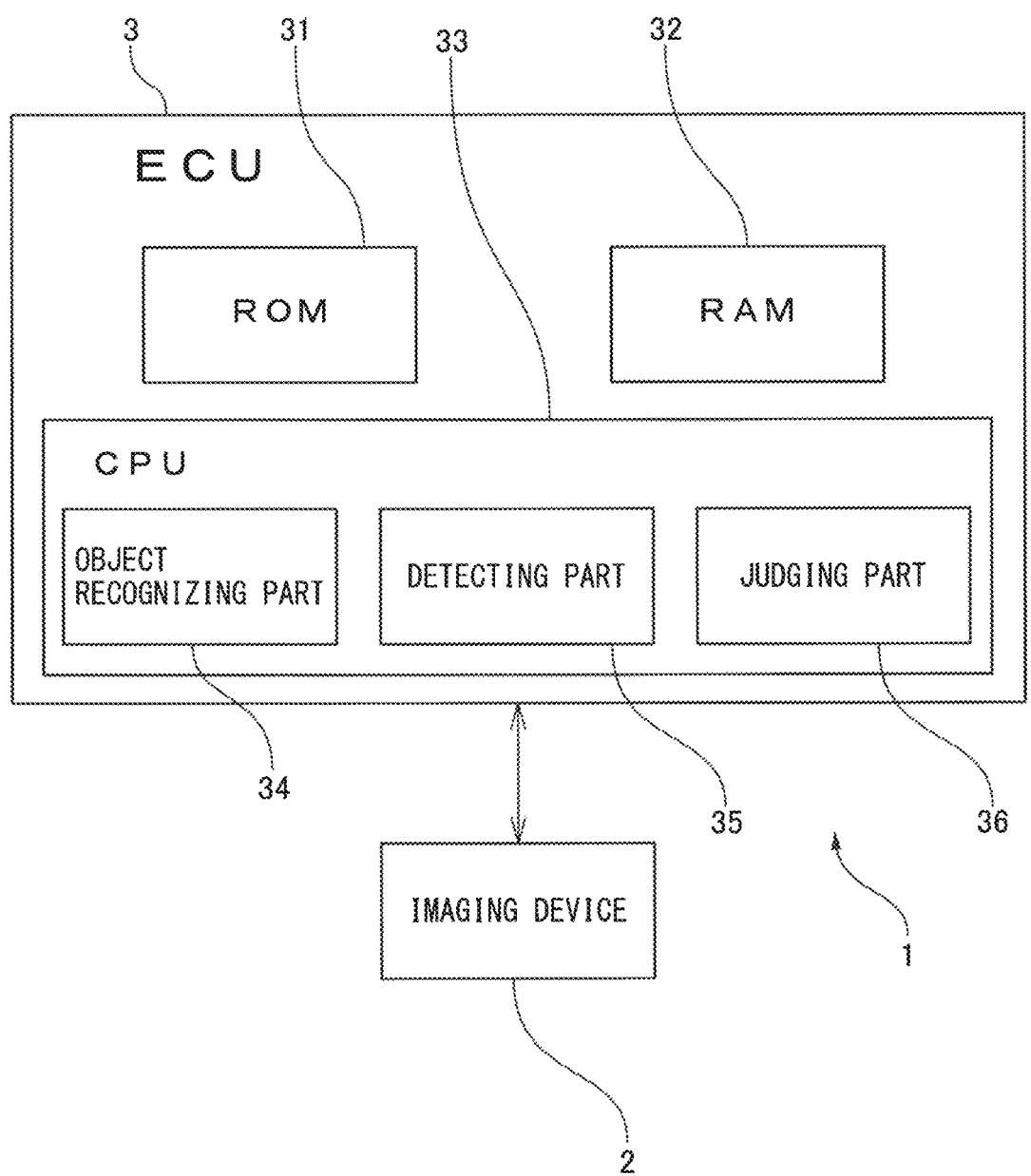
FIG. 1 is a block diagram showing the configuration of an object monitoring device according to a first embodiment of the present invention.

Below, embodiments of the present invention will be explained in detail referring to the drawings. Note that, in the following explanation, similar components are assigned the same reference notations.

First Embodiment

Below, referring to FIG. 1 to FIG. 4, a first embodiment of the present invention will be explained.

<Configuration of Object Monitoring Device>

FIG. 1 is a block diagram showing the configuration of an object monitoring device according to the first embodiment of the present invention. The object monitoring device 1 monitors an object.

The object monitoring device 1 is provided with an imaging device 2 and ECU (electronic control unit) 3. The imaging device 2 is fastened at a predetermined position and captures an image of a predetermined range to generate an image. The predetermined range is a range in which a predetermined object (monitored object) should be present. In the present embodiment, the object which is monitored is a driver of a vehicle. For this reason, the object monitoring device 1 is mounted in a vehicle to monitor the driver of the vehicle.

Figure 2:
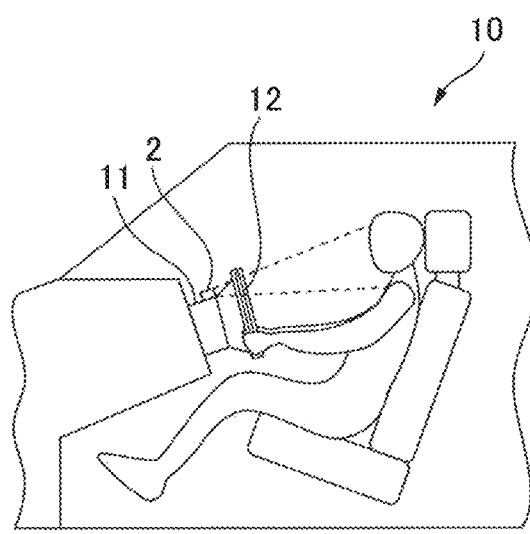
FIG. 2 is a view schematically showing the inside of a vehicle mounting an object monitoring device.

FIG. 2 is a view schematically showing the inside of a vehicle mounting the object monitoring device 1. The vehicle 10 is for example an automated driving vehicle able to be automatically driven. The imaging device 2 captures an image of a range in which the driver of the vehicle 10 should be present and generates an image of the driver. In the present embodiment, the imaging device 2 is a so-called "driver monitor camera". The imaging device 2 is provided at the inside of the vehicle 10. Specifically, as shown in FIG. 2, the imaging device 2 is provided at a top part of a steering column 11 of the vehicle 10. FIG. 2 shows the range of capture of the imaging device 2 by broken lines. Note that, the imaging device 2 may be provided at a steering wheel 12 of the vehicle 10, a room mirror, meter panel, meter hood, etc.

The imaging device 2 is provided with a camera and projector. The camera includes a lens and imaging element. For example, it is a CMOS (complementary metal oxide semiconductor) camera or CCD (charge coupled device) camera. The projector is comprised of LEDs (light emitting diodes). For example, it is comprised of two near infrared LEDs arranged at the two sides of the camera. By irradiating the driver by near infrared light, it is possible to capture an image of a face of the driver at night or another time of low light without giving an unpleasant feeling to the driver. Further, a bandpass filter for removing light of wavelength components other than near infrared is provided inside the camera and a visible light cut filter removing light of a red wavelength component from the near infrared LEDs is provided at the front surface of the projector.

The operation of the imaging device 2 is controlled by the ECU 3. For example, the imaging device 2 repeatedly captures the range in which the driver of the vehicle 10 should be present at predetermined intervals when the ignition switch of the vehicle 10 is ON. The image generated by the imaging device 2 (below, simply referred to as the "image") is sent from the imaging device 2 to the ECU 3.

<Control of Object Monitoring Device>

The ECU 3 is a microcomputer provided at the vehicle 10 and performs various types of control. The ECU 3 is provided with a ROM (read only memory) 31, RAM (random access memory) 32, and CPU (central processing unit) 33. The ROM 31 and RAM 32 are connected to the CPU 33 through signal wires. Further, the ECU 3 is further provided with a power circuit, input port, output port, communication module, etc. Note that, in the present embodiment, one ECU 3 is provided, but a plurality of ECUs may be provided for different functions.

The ROM 31 stores various data. For example, it stores computer programs etc., for the CPU 33 to perform various processing. The ROM 31 is one example of a storage part. The RAM 32 stores data generated when the CPU 33 performs various processing. In the present embodiment, the CPU 33 runs computer programs stored in the ROM 31 to thereby function as an object recognizing part 34, detecting part 35, and judging part 36.

The object recognizing part 34 recognizes the driver based on an image. Specifically, the object recognizing part 34 receives an image from the imaging device 2 and detects the face of the driver from the image to thereby recognize the driver. When the face of the driver is not detected from the image, the object recognizing part 34 does not recognize the driver.

Basically, when the driver is normal, that is, when the driver is fulfilling his duty of monitoring the surroundings of the vehicle 10 while being driven, the face of the driver falls in the angle of view of the camera of the imaging device 2 and the face of the driver is detected. On the other hand, if the driver is abnormal, for example, if the driver blocks the lens of the imaging device 2 by his own body or some article he owns, if the driver is looking at his smart phone etc., if the driver leaves his seat, etc., the face of the driver cannot be detected.

For example, the state of the face of the driver detected by the object recognizing part 34 changes according to the detected states of parts of the face of the driver. The object recognizing part 34 identifies the facial region from an image and extracts features of parts of the face such as the eyes, nose, and mouth to thereby detect the parts of the face. For example, if the parts of the face like the eyes and nose are detected, the face of the driver is detected by the object recognizing part 34. If the parts of the face like the eyes and nose are not detected, the face of the driver is not detected by the object recognizing part 34.

Note that, the method for recognizing the face of the driver may be another method. For example, the object recognizing part 34 may learn a large amount of facial images of drivers in the normal state and detect the faces of the drivers by deep learning or other techniques. In this case, so long as it is supposed that a driver is normal, even when parts of the face such as the eyes and nose are not detected, the face of the driver is detected by the object recognizing part 34.

If the imaging device 2 becomes abnormal, for example, if the lens of the imaging device 2 becomes abnormal (dirty, clouded, etc.), the image becomes unclear. The detecting part 35 receives an image from the imaging device 2 and detects that the image is unclear. For example, the detecting part 35 detects that an image is unclear if the output of only a part of pixels of the imaging element does not change much at all in a predetermined time. If it is detected that the image is unclear, detection information showing that the image is unclear (below, simply referred to as the "detection information") is stored in the ROM 31.

Note that the method of detecting that the image is unclear may be another method as well. For example, the detecting part 35 may detect that the image is unclear if the brightness of only a part of pixels of the imaging element is equal to or less than a predetermined value in a predetermined time period.

When the driver is not recognized by the object recognizing part 34 based on the image, the judging part 36 judges the cause of the driver not being recognized. As the cause of the driver not being recognized, abnormality of the imaging device 2 or abnormality of the driver may be considered. For this reason, the judging part 36 identifies the cause of the driver not being recognized as an abnormality of the imaging device 2 or an abnormality of the driver.

Figure 3:
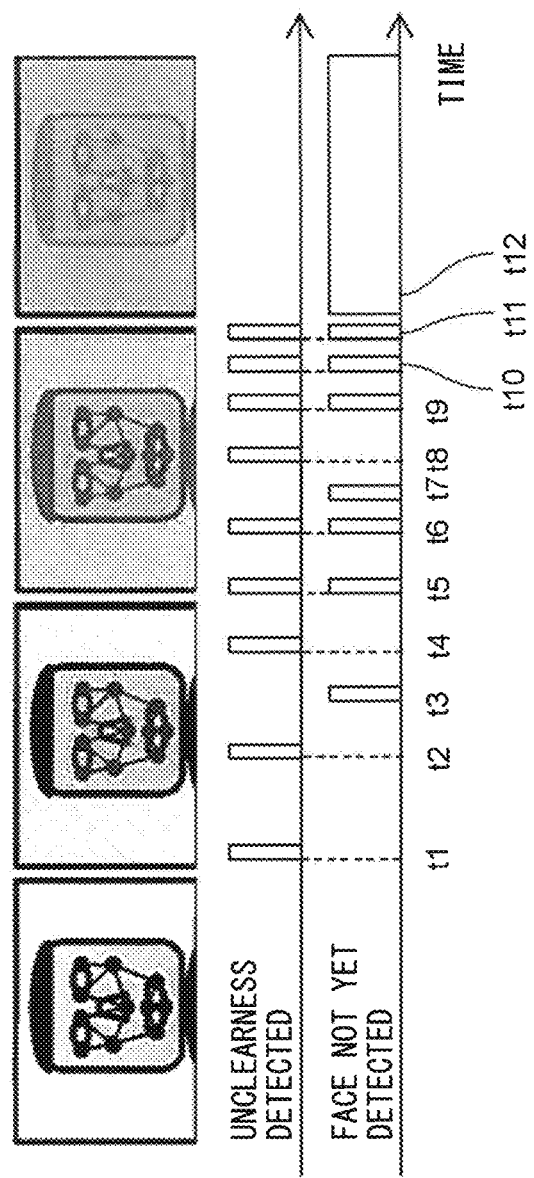
FIG. 3 is a view schematically showing a state where an image generated by an imaging device gradually becomes unclear.

FIG. 3 is a view schematically showing the state where an image gradually becomes unclear. FIG. 3 simply shows changes along with time in a facial image of a driver generated by the imaging device 2. In the example of FIG. 3, it is detected that the image is unclear at the time t1, time t2, time t4 to time t6, time t8, and time t9 to time t11. Further, at the time t3, time t5 to time t7, and time t9 to time t11, the face of the driver is not detected based on the image. That is, at these times, the driver is not recognized by the object recognizing part 34. Further, at the time t12 on, the state where the face of the driver is not detected continues.

If the driver is not recognized based on the image and it is detected that the image is unclear (time t5, time t6, and time t9 to time t11), it is guessed that the imaging device 2 is abnormal. For this reason, the judging part 36 judges that the cause of the driver not being recognized is in the imaging device 2 if the driver is not recognized based on the image and it is detected that the image is unclear.

If, like at the time t12 on, the imaging device 2 becomes increasingly abnormal and the image as a whole becomes unclear, the detecting part 35 cannot detect the image being unclear. Further, in this case, the driver is not recognized due to abnormality in the imaging device 2. On the other hand, at the time t3 and time t7, the driver is not recognized due to abnormality of the driver. Therefore, like at the time t12 on and at the time t3 and time t7, if a state occurs where the driver is not recognized based on the image and it is not detected that the image is unclear (below, referred to as the "first state"), as the cause of the driver not being recognized, abnormality of the driver or abnormality of the imaging device 2 may be considered.

As will be understood from FIG. 3, the number of times and frequency of it being detected that an image is unclear increase as the degree of unclearness becomes greater. Further, the imaging device 2 is believed to gradually become increasingly abnormal and the degree of unclearness is believed to gradually become greater as well. For this reason, a difference is believed to arise in the detection information in a predetermined time period until the first state occurs (below, referred to as the "predetermined time period") in accordance with the cause of the driver not being recognized.

Therefore, in the present embodiment, when the first state occurs, the judging part 36 judges based on the detection information at a predetermined time period whether the cause of the driver not being recognized is in the imaging device 2. By doing this, it is possible to precisely judge the cause of the driver not being recognized. Further, it is possible to keep a warning from being given to the driver despite the driver being normal. By doing this, it is possible to keep the driver from being given an unpleasant feeling.

For example, when the first state occurs, the judging part 36 judges that the cause of the driver not being recognized is in the imaging device 2 if the number of times or frequency of it being detected that the image is unclear in a predetermined time period is equal to or more than a predetermined value. On the other hand, when the first state occurs, the judging part 36 judges that the cause of the driver not being recognized is in the driver if the number of times or frequency of it being detected the image is unclear in a predetermined time period is less than the predetermined value. Note that the "frequency" means the ratio of it being detected that the image is unclear if a predetermined number of images are generated.

Further, when the first state has occurred, the judging part 36 may judge that the cause of the driver not being recognized is in the imaging device 2 if the frequency of it being detected that the image is unclear is increasing along with the elapse of time in a predetermined time period. In this case, when the first state has occurred, the judging part 36 judges that the cause of the driver not being recognized is in the driver if the frequency of it being detected that the image is unclear is not increasing along with time in a predetermined time period.

When an abnormality of the imaging device 2 causes the first state to occur, the state where the face of the driver is not recognized continues until the abnormality of the imaging device 2 is eliminated. Further, if the abnormality of the imaging device 2 is dirt or clouding of the lens, often simple cleaning of the lens will eliminate the abnormality of the imaging device 2. For this reason, when the first state has occurred, the judging part 36 may prompt the driver to clean the imaging device 2 if judging that the cause of the driver not being recognized is in the imaging device 2. By doing this, it is possible to decrease the time required for repair of the imaging device 2. Further, if the vehicle 10 is an automated driving vehicle, automated driving can be continued by the face of the driver being again recognized by the object monitoring device 1.

<Processing for Judging Cause>

Figure 4:
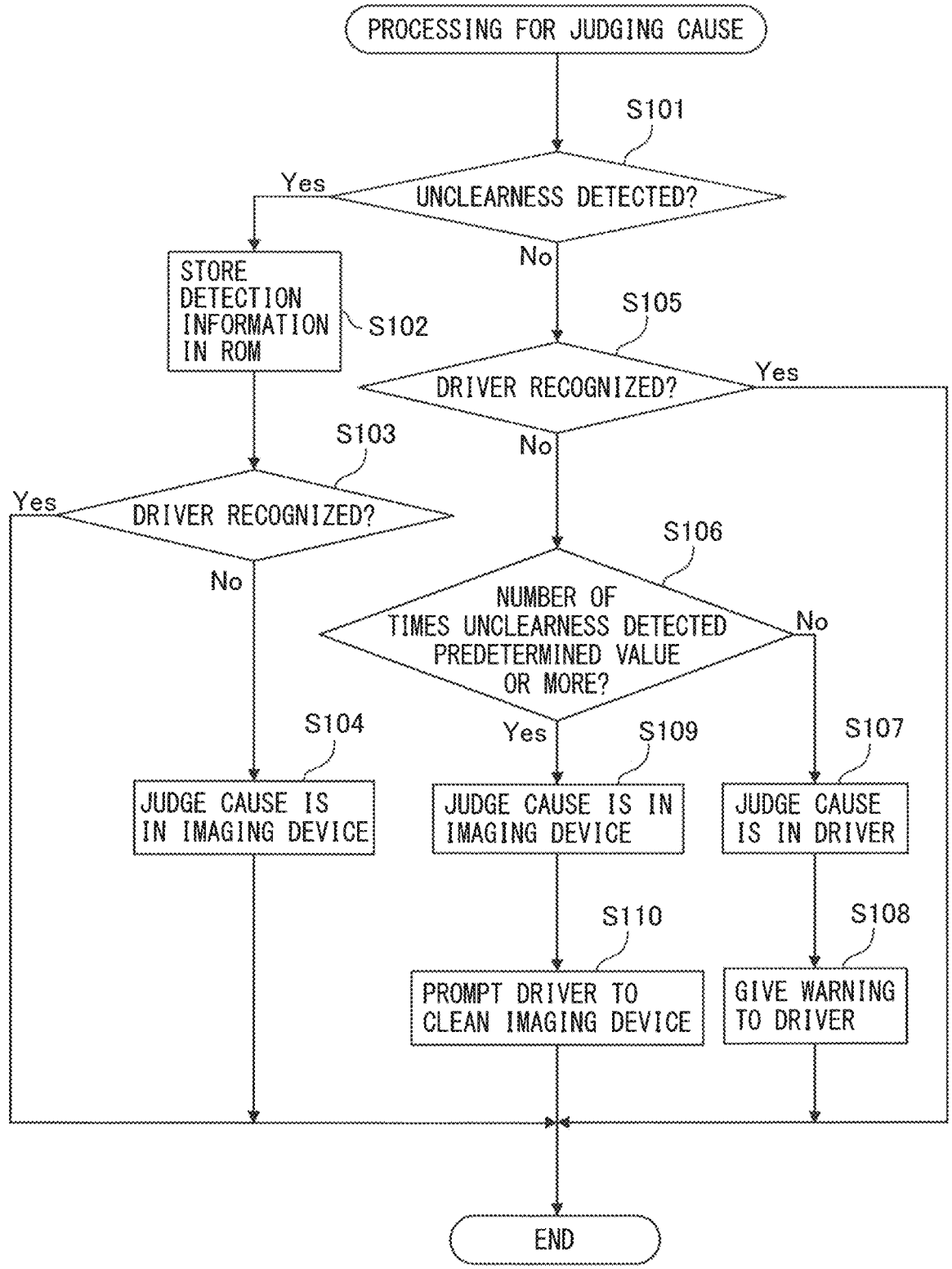
FIG. 4 is a flow chart showing a control routine of processing for judging a cause in the first embodiment.

Below, referring to the flow chart of FIG. 4, control for judging the cause of the driver not being recognized will be explained in detail. FIG. 4 is a flow chart showing a control routine of processing for judging a cause in the first embodiment. The present control routine is repeatedly executed at predetermined execution intervals by the CPU 33 of the ECU 3. The predetermined execution intervals are for example intervals at which images are sent from the imaging device 2 to the ECU 3.

First, at step S101, the judging part 36 judges whether the image being unclear is detected by the detecting part 35. If it is judged that the image being unclear is detected, the present control routine proceeds to step S102.

At step S102, the judging part 36 stores the detection information in the ROM 31. The detection information includes the date and time at which the image being unclear was detected. Next, at step S103, the judging part 36 judges whether the object recognizing part 34 has recognized the driver based on the image. If it is judged that the driver has been recognized, the present control routine ends.

On the other hand, if at step S103 it is judged that the driver has not been recognized, the present control routine proceeds to step S104. At step S104, the judging part 36 judges that the cause of the driver not being recognized is in the imaging device 2 (specifically, the lens of the imaging device 2). Further, the judging part 36 may notify the abnormality of the imaging device 2 to the driver through an HMI (human machine interface) provided at the vehicle 10. After step S104, the present control routine ends.

Further, if at step S101 it is judged that it was not detected that the image was unclear, the present control routine proceeds to step S105. At step S105, the judging part 36, in the same way as step S103, judges whether the driver has been recognized by the object recognizing part 34 based on the image. If it is judged that the driver has been recognized, the present control routine ends.

On the other hand, if at step S105 it is judged that the driver has not been recognized, the present control routine proceeds to step S106. In this case, the first state occurs. At step S106, the judging part 36 judges based on the detection information at a predetermined time period whether the cause of the driver not being recognized is in the imaging device 2 based on the detection information at a predetermined time period. Specifically, the judging part 36 judges based on the detection information at a predetermined time period whether the number of times it was detected that the image was not clear in the predetermined time period is equal to or more than a predetermined value. The detection information at a predetermined time period is stored in the ROM 31. The predetermined time period and the predetermined value are determined in advance by experiments. The predetermined time period has as its end point the time when the first state occurs. For example, the predetermined time period is several hours to several months.

If at step S106 it is judged that the number of times that it is detected that an image is unclear in a predetermined time period is less than a predetermined value, the present control routine proceeds to step S107. At step S107, the judging part 36 judges that the cause of the driver not being recognized is in the driver. Next, at step S108, the judging part 36 issues a warning to the driver through the HMI etc. After step S108, the present control routine ends.

On the other hand, if at step S106 it is judged that the number of times that it is detected that an image is unclear in a predetermined time period is equal to or more than a predetermined value, the present control routine proceeds to step S109. At step S109, the judging part 36 judges that the cause of the driver not being recognized is in the imaging device 2 (specifically, lens of imaging device 2). Further, the judging part 36 may notify the driver of an abnormality of the imaging device 2 through the HMI etc. Next, at step S110, the judging part 36 prompts the driver to clean the imaging device 2 through the HMI etc. After step S110, the present control routine ends.

Note that, at step S106, the judging part 36 may judge based on the detection information at a predetermined time period whether the frequency of it being detected that the image is unclear in a predetermined time period is equal to or more than a predetermined value. Further, at step S106, the judging part 36 may judge based on the detection information at a predetermined time period whether the frequency of it being detected that the image is unclear is increasing along with time in the predetermined time period.

Further, after step S104, in the same way as step S110, the judging part 36 may prompt the driver to clean the imaging device 2 through the HMI etc. Further, step S110 may also be omitted.

Second Embodiment

The configuration and control of the object monitoring device according to the second embodiment are basically similar to the configuration and control of the object monitoring device according to the first embodiment except for the points explained below. For this reason, below, in the second embodiment of the present invention, parts different from the first embodiment will be centered on in the explanation.

As explained above, the number of times and frequency of it being detected that the image is unclear increase as the degree of unclearness becomes greater. Further, as the degree of unclearness becomes greater, the number of times and frequency of the face of the driver not being recognized also increase. As a result, the number of times and frequency of it being judged that the cause of the driver not being recognized is in the imaging device 2 when the first state has not occurred, as at the time t5, time t6, and time t9 to time t12 of FIG. 3, increase as the degree of unclearness becomes greater.

For this reason, in the second embodiment, the judging part 36 stores the detection information in the ROM 31 only when the first state has not occurred and it is judged that the cause of the driver not being recognized is in the imaging device 2. Further, when the first state has occurred, the judging part 36 judges that the cause of the driver not being recognized is in the imaging device 2 if the number of times or frequency of it being judged that the cause of the driver not being recognized is in the imaging device 2 when the first state has not occurred in the predetermined time period is equal to or more than a predetermined value. On the other hand, when the first state has occurred, the judging part 36 judges that the cause of the driver not being recognized is in the driver if the number of times or frequency of it being judged that the cause of the driver not being recognized is in the imaging device 2 when the first state has not occurred in a predetermined time period is less than a predetermined value. Note that the "frequency" means the ratio of it being judged that the cause of the driver not being recognized is in the imaging device 2 when the first state has not occurred, if a predetermined number of images are generated.

Further, when the first state has occurred, the judging part 36 may judge that the cause of the driver not being recognized is in the imaging device 2 if the frequency of it being judged that the cause of the driver not being recognized is in the imaging device 2 when the first state has not occurred in a predetermined time period increases along with time. In this case, when the first state has occurred, the judging part 36 judges that the cause of the driver not being recognized is in the driver if the frequency of it being judged that the cause of the driver not being recognized is in the imaging device 2 when the first state has not occurred in a predetermined time period does not increase along with time.

According to the control in the second embodiment, it is possible to precisely judge the cause of the driver not being recognized and possible to reduce the required storage capacity of the ROM.

<Processing for Judging Cause>

Figure 5:
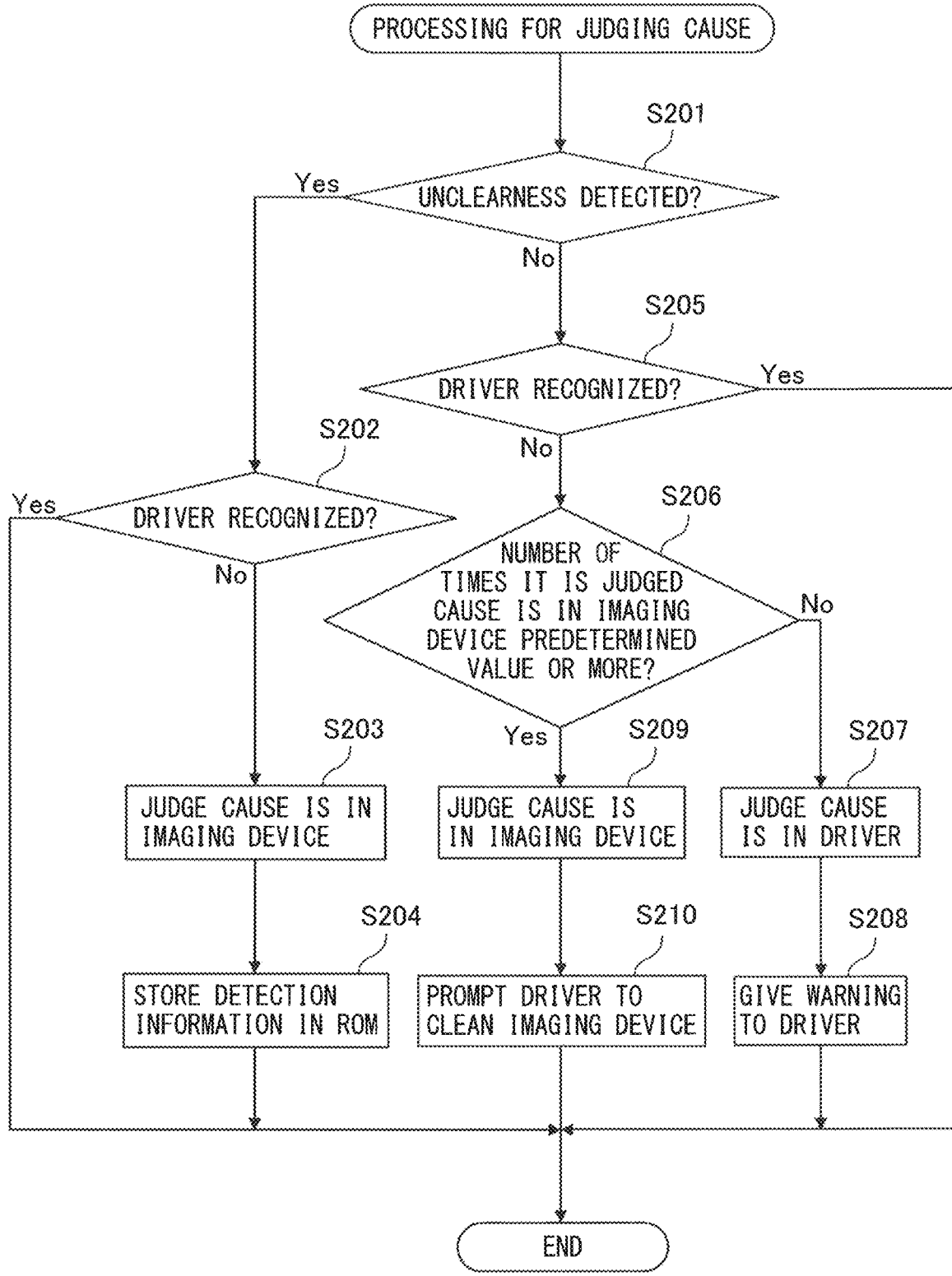
FIG. 5 is a flow chart showing a control routine of processing for judging a cause in a second embodiment.

FIG. 5 is a flow chart showing a control routine of processing for judgment of cause in the second embodiment. The present control routine is repeatedly executed by the CPU 33 of the ECU 3 at predetermined execution intervals. The predetermined execution intervals are for example the intervals at which images are sent from the imaging device 2 to the ECU 3.

Step S201 to step S203 and step S205 are similar to step S101 and step S103 to step S105 of FIG. 4, so the explanation will be omitted. The present control routine proceeds to step S204 after step S203. In this case, it is judged that the cause of the driver not being recognized is in the imaging device 2 when the first state has not occurred. For this reason, at step S204, the judging part 36 stores the detection information in the ROM 31. After step S204, the present control routine ends.

Further, if at step S205 it is judged that the driver has not been recognized, at step S206, the judging part 36 judges based on the detection information in a predetermined time period whether the cause of the driver not being recognized is in the imaging device 2. Specifically, the judging part 36 judges based on the detection information in a predetermined time period whether the number of times it is judged that the cause of the driver not being recognized is in the imaging device 2 when the first state has not occurred in the predetermined time period is equal to or more than a predetermined value. The detection information in a predetermined time period is stored in the ROM 31. The predetermined time period and the predetermined value are determined in advance by experiments. The predetermined time period has as its end point the time when the first state occurs. For example, the predetermined time period is several hours to several months.

If it is judged at step S206 that the number of times of it being judged that the cause of the driver not being recognized is in the imaging device 2 when the first state has not occurred in a predetermined time period is less than a predetermined value, the present control routine proceeds to step S207. In this case, in the same way as step S107 and step S108 of FIG. 4, the judging part 36 judges at step S207 that the cause of the driver not being recognized is in the driver, and issues a warning to the driver at step S208. After step S208, the present control routine ends.

On the other hand, when at step S206 it is judged that the number of times it is judged that the cause of the driver not being recognized is in the imaging device 2 when the first state has not occurred in a predetermined time period is equal to or more than a predetermined value, the present control routine proceeds to step S209. In this case, in the same way as step S109 and step S110 of FIG. 4, the judging part 36 judges at step S209 that the cause of the driver not being recognized is in the imaging device 2 (specifically, the lens of the imaging device 2) and at step S210 prompts the driver to clean the imaging device 2. After step S210, the present control routine ends.

Note that, at step S206, the judging part 36 may judge based on the detection information at a predetermined time period whether the frequency of it being judged that the cause of the driver not being recognized is in the imaging device 2 when the first state has not occurred in the predetermined time period is equal to or more than a predetermined value. Further, at step S106, the judging part 36 may judge based on the detection information at a predetermined time period whether the frequency of it being judged that the cause of the driver not being recognized is in the imaging device 2 when the first state has not occurred is increasing along with time in the predetermined time period.

Further, after step S203 or step S204, in the same way as step S110 of FIG. 4, the judging part 36 may prompt the driver to clean the imaging device 2. Further, step S210 may be omitted.

Above, preferred embodiments according to the present invention were explained, but the present invention is not limited to these embodiments and may be corrected and changed in various ways within the language of the claims. For example, the object being monitored may be a person other than the driver, an animal, a workpiece in a factory, etc.

REFERENCE SIGNS LIST

1 object monitoring device
2 imaging device
3 ECU
31 ROM
32 RAM
33 CPU
34 object recognizing part
35 detecting part
36 judging part

The invention claimed is:

1. An object monitoring device comprising
an imaging device capturing an image of a range in which a predetermined object should be present and generating an image,
an object recognizing part configured to recognize the object based on the image,
a detecting part configured to detect that the image is unclear,
a storage part configured to store detection information showing that it has been detected that the image is unclear, and
a judging part configured to judge a cause for the object not being recognized when the object is not recognized based on the image, wherein
when a state occurs where the object is not recognized based on the image and it is not detected that the image is unclear, the judging part is configured to judge whether the cause is in the imaging device based on the detection information in a predetermined time period until the state occurs.

2. The object monitoring device according to claim 1, wherein when the state occurs, the judging part is configured to judge that the cause is in the imaging device if the number of times or frequency of it being detected that the image is unclear in the predetermined time period is equal to or more than a predetermined value.

3. The object monitoring device according to claim 1, wherein when the state occurs, the judging part is configured to judge that the cause is in the imaging device if a frequency of it being detected that the image is unclear increases along with time in the predetermined time period.

4. The object monitoring device according to claim 1, wherein
the judging part is configured to judge that the cause is in the imaging device if the object is not recognized based on the image and it is detected that the image is unclear, and
when the state occurs, the judging part is configured to judge that the cause is in the imaging device if the number of times or frequency of it being judged that the cause is in the imaging device when the state has not occurred in the predetermined time period is equal to or more than a predetermined value.

5. The object monitoring device according to claim 1, wherein
the judging part is configured to judge that the cause is in the imaging device if the object is not recognized based on the image and it is detected that the image is unclear, and
when the state occurs, the judging part is configured to judge that the cause is in the imaging device if a frequency of it being judged that the cause is in the imaging device when the state has not occurred increases along with time in the predetermined time period.

6. The object monitoring device according to claim 1, wherein the object is a driver of a vehicle.

7. The object monitoring device according to claim 2, wherein the object is a driver of a vehicle.

8. The object monitoring device according to claim 3, wherein the object is a driver of a vehicle.

9. The object monitoring device according to claim 4, wherein the object is a driver of a vehicle.

10. The object monitoring device according to claim 5, wherein the object is a driver of a vehicle.

11. The object monitoring device according to claim 6, wherein the judging part is configured to prompt the driver to clean the imaging device if judging that the cause is in the imaging device when the state occurs.

12. The object monitoring device according to claim 7, wherein the judging part is configured to prompt the driver to clean the imaging device if judging that the cause is in the imaging device when the state occurs.

13. The object monitoring device according to claim 8, wherein the judging part is configured to prompt the driver to clean the imaging device if judging that the cause is in the imaging device when the state occurs.

14. The object monitoring device according to claim 9, wherein the judging part is configured to prompt the driver to clean the imaging device if judging that the cause is in the imaging device when the state occurs.

15. The object monitoring device according to claim 10, wherein the judging part is configured to prompt the driver to clean the imaging device if judging that the cause is in the imaging device when the state occurs.

16. An object monitoring device comprising
an imaging device capturing an image of a range in which a predetermined object should be present and generating an image,
a control device configured to recognize the object based on the image, detect that the image is unclear, and judge a cause for the object not being recognized when the object is not recognized based on the image, and
a storage device storing detection information showing that it has been detected that the image is unclear, wherein
when a state occurs where the object is not recognized based on the image and it is not detected that the image is unclear, the control device is configured to judge whether the cause is in the imaging device based on the detection information in a predetermined time period until the state occurs.

* * * * *